United States Patent
Brčin et al.

(10) Patent No.: US 7,305,539 B2
(45) Date of Patent: Dec. 4, 2007

(54) ADAPTIVE BOOTING FROM MASS STORAGE DEVICE

(75) Inventors: Slobodan Brčin, Belgrade (YU); Akiva Bleyer, Givatayim (IL); Alon Ziegler, Ramat Gan (IL)

(73) Assignee: SanDisk IL Ltd., Kfar Saba (IL)

( * ) Notice: Subject to any disclaimer, the term of this patent is extended or adjusted under 35 U.S.C. 154(b) by 46 days.

(21) Appl. No.: 11/102,814

(22) Filed: Apr. 11, 2005

(65) Prior Publication Data

US 2006/0085628 A1    Apr. 20, 2006

Related U.S. Application Data

(60) Provisional application No. 60/618,491, filed on Oct. 14, 2004.

(51) Int. Cl.
G06F 12/00    (2006.01)
G06F 15/177   (2006.01)

(52) U.S. Cl. .................. 711/173; 711/202; 713/1
(58) Field of Classification Search ................. 711/173
See application file for complete search history.

(56) References Cited

U.S. PATENT DOCUMENTS

| | | | |
|---|---|---|---|
| 5,692,190 A * | 11/1997 | Williams | 713/2 |
| 5,701,477 A * | 12/1997 | Chejlava, Jr. | 713/2 |
| 5,710,941 A * | 1/1998 | Parry | 710/14 |
| 6,308,264 B1 * | 10/2001 | Rickey | 713/2 |
| 6,732,230 B1 * | 5/2004 | Johnson et al. | 711/114 |
| 2002/0198865 A1 * | 12/2002 | Rafanello | 707/1 |
| 2003/0225982 A1 * | 12/2003 | Fujita et al. | 711/148 |
| 2004/0003314 A1 * | 1/2004 | Witt et al. | 714/6 |
| 2005/0071618 A1 * | 3/2005 | Natu | 713/1 |
| 2005/0071620 A1 * | 3/2005 | Natu | 713/2 |
| 2005/0172111 A1 * | 8/2005 | Marcak et al. | 713/1 |
| 2005/0198485 A1 * | 9/2005 | Nguyen et al. | 713/1 |

* cited by examiner

*Primary Examiner*—Matthew Kim
*Assistant Examiner*—Michael Krofcheck
(74) *Attorney, Agent, or Firm*—Mark M. Friedman (57) ABSTRACT

A prior art mass storage device for bootstrap loading of a computer operating system must be configured on a set-up computer whose BIOS has the same geometrical translation scheme as the BIOS of the host computer where the storage device is intended to be installed and used. The present invention provides a mass storage device capable of bootstrap loading the computer operating system despite differences between the BIOS geometrical translation scheme of the set-up computer and that of the host computer, along with methods for implementing and preparing such a device. The present invention provides executable code on the storage device itself, which resolves the geometrical translation of the set-up configuration to comply with that of the host computer, independent of the respective BIOS translation schemes used for set-up and host computers.

9 Claims, 5 Drawing Sheets

ADAPTIVE BOOTING FROM MASS STORAGE DEVICE

The present application claims benefit of U.S. Provisional Patent Application No. 60/618,491 filed Oct. 14, 2004.

FIELD OF THE INVENTION

The present invention relates to computer data storage devices and, more particularly, to a device and method for loading an operating system into a computer.

BACKGROUND OF THE INVENTION

During the startup loading (commonly denoted as a "bootstrap" loading, a "boot", or "booting") into a computer's main memory of an operating system from a mass storage device, for certain mass storage device classes it is assumed that the device is characterized by a set of parameters traditionally-associated with the geometry of early disk drive devices. These parameters are referred to as "CHS" parameters (for the "Cylinder-Head-Sector" arrangement of the early disk drives). A head defines a plane (physically, the disk surface which the head reads and writes). A track is geometrically the (circular) intersection of a cylinder and the plane specified by a head. There are the following parameters in CHS notation:
 three constant integers describe the geometry and specify the total number of sectors of a mass storage device:
  C, the total number of cylinders;
  H, the total number of heads; and
  S, the number of sector per track.
 three variable integers define the address of a sector in a mass storage device.
  c, the cylinder number (between 0 and C-1);
  h, the head number (between 0 and H-1); and
  s, the sector number within the track (between 1 and s).

"Active" and "Bootable" Partitions

The storage area of a mass storage device is typically "partitioned", or divided into logically separate areas. Even if the entire usable storage area is devoted to a single such partition, the device is said to be partitioned. For a mass storage device to be capable of boot-loading an operating system, exactly one partition must be designated as the "active" partition. An active partition is designated with a Boot Indicator flag equal to 80h in the Partition Table (detailed below). A partition containing executable code capable of directly or indirectly loading an operating system is denoted as a "bootable" partition. More than one partition may contain executable code for loading an operating system (and thus be bootable), but only the currently-designated active partition is selected for booting at startup. The active partition is thus intended to be bootable, but in practice the active partition may fail to boot the system. There are various conditions which result in a boot failure, one of which involves incompatibilities between the computer's Basic I/O System (BIOS) and the geometrical configuration specified for the mass storage device, as covered in detail below.

Prior-Art Startup Loading Sequence

Figure 1:
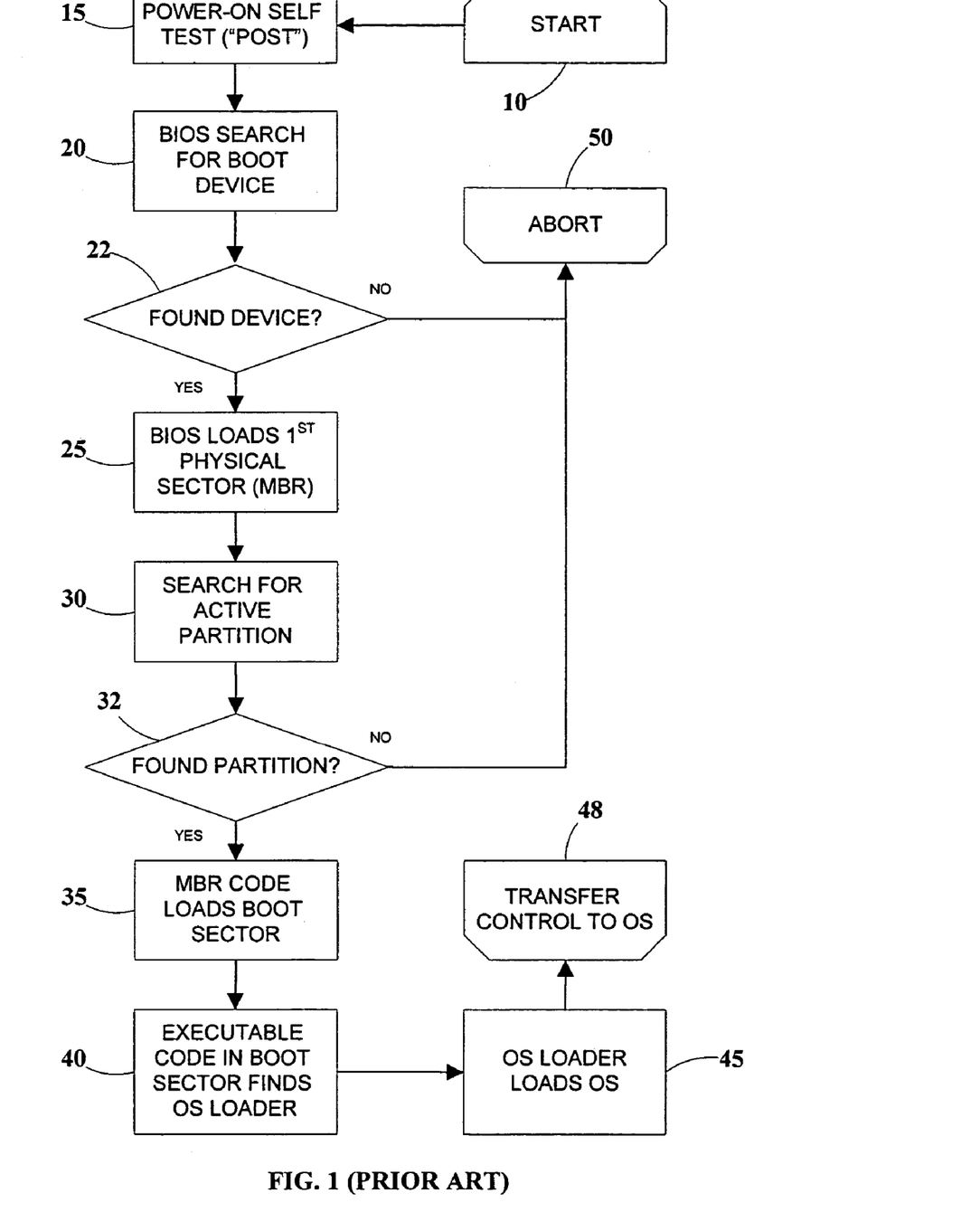
FIG. 1 is a flowchart of a prior procedure for startup loading of a computer operating system.

FIG. 1 is a flowchart of a prior art procedure for startup loading of an operating system. In a starting point 10, the computer is started, and in a step 15, the BIOS initiates a "Power-On Self Test" (POST) of the hardware. In a step 20, the BIOS searches for a storage device capable of startup loading. (For compactness and clarity, the drawings refer to startup loading as "boot".) At a decision point 22, if such a device is not found, the process aborts in a termination 50. If such a device is found, in a step 25 the BIOS loads the first physical sector, known as the "Master Boot Record" (MBR). In a step 30, a search is conducted for an active partition on the device. At a decision point 32, if an active partition is not found, the process aborts in termination 50. If an active partition is found, in a step 35 the executable code obtained from the MBR is run to load into the computer's memory the bootable partition sector containing the executable code for startup loading (herein denoted as the "boot sector") using the BIOS "Read Sector" function Int13h function 02. In a step 40 the executable code obtained from the boot sector is run to find and execute the operating system loader, which then loads the operating system in a step 45. Finally, control is transferred to the loaded operating system, to terminate the startup loading process, in a termination 48.

It is noted that in mass storage devices having a capacity of 8.4 GB or less, the MBR uses "Enhanced CHS" parameters (at byte offset 01, 02, and 03, in the Partition Table, as is detailed below).

The first sector in the active partition contains bootstrap code and a "BIOS Parameter Block" (BPB) table (see Table 2). The BPB contains information used by the operating system to access the mass storage device. On computers running NT-based Windows, the executable code in the boot sector finds the operating system loader (the system file "ntldr"), which is then loaded into memory, after which the boot sector code transfers execution to the loader. The operating system loader uses parameters from the MBR and the BPB to continue the boot. For example, in a multi-operating system boot, the loader reads the MBR to find the start of the second partition. Other actions may be taken, depending the specific operating system and the specific loader involved.

As noted above, for certain storage device classes, access to the sectors of the storage device is achieved by specifying CHS parameters. In this case, FIG. 1 illustrates an optimistic scenario, where the CHS parameters available to the BIOS correspond to those of the storage device, and thus access to the boot sector is successful. As detailed below, however, it can happen that the CHS parameters available to the BIOS do not correspond to those of the storage device, in which case access to the device will fail.

Incompatibility Fundamentals

The incompatibility problem arises fundamentally because there are inherent limitations in the CHS parameter scheme. The ability of CHS parameters to address sectors of mass storage suffers from certain shortcomings that limits the usable amount of storage. For example, the conventional BIOS interface supports a maximum of 1024 cylinders, a maximum of 256 heads, and a maximum of 63 sectors per track. These result in a limit of 8.4 GB in a mass storage device for a conventional BIOS. A larger, more modern mass storage device, however, might be configured with 65536 cylinders, 16 heads, and 255 sectors per track, for a storage of 136.9 GB. Unfortunately, with the conventional BIOS such a device can be used only with 1024 cylinders (the BIOS limit), 16 heads (the device limit), and 63 sectors per track (the BIOS limit), for a total storage of only 504 MB—less than 0.4% of the actual storage device capacity. The limit shown in this example is encountered with IDE mass-storage disk drives (on account of the 16-head limit for IDE drives), and is frequently referred to as the "504 MB barrier".

Overcoming CHS Limitations

Figure 4A:
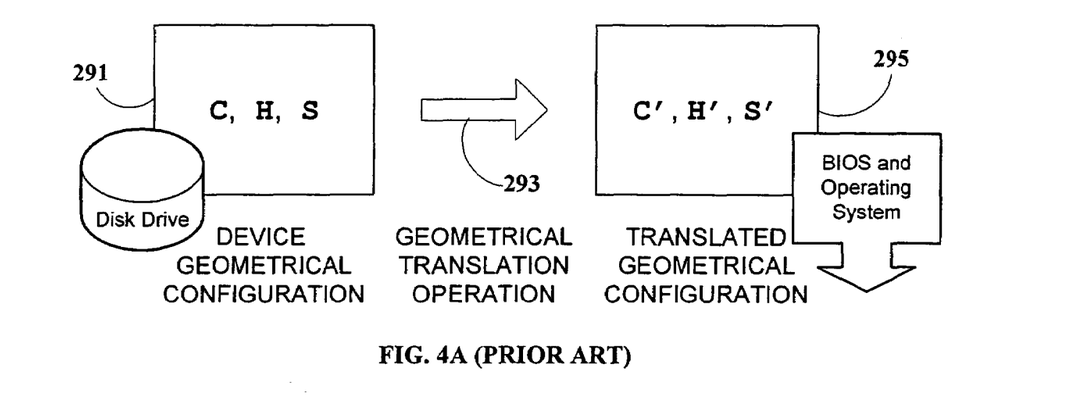
FIG. 4A is a conceptual diagram showing the terminology of prior art geometrical translation.

In response to an increasing need for larger mass storage devices, developers have employed various techniques to bypass such limitations. One technique is to use "Logical Block Addressing" (LBA), which does not depend on storage device geometry. Unfortunately, however, not all storage devices support LBA. For those which do not support LBA, CHS references are necessary. Some typical techniques for adapting CHS references include, but are not limited to: employing a false geometry for "geometrical translation" of the storage device, which accommodates the conventional BIOS limit, and which eases the restriction thereof; and "bit shifting", by which the BIOS can consider the storage device as having an increased number of heads to compensate for the reduced number of cylinders. "Geometrical translation" is detailed as follows:

The term "geometrical translation scheme" herein denotes the manner and algorithmic rules by which a BIOS performs geometrical translation. FIG. 4A conceptually illustrates the process of geometrical translation. A device geometrical configuration 291 features parameters C, H, and S, as described above. The physical disk drive and/or the controller thereof make reference to these C, H, and S parameters. Device geometrical configuration 291 may be used even by a disk drive which does not actually have the specific physical structure implied by the C, H, and S parameters. In fact, the use of device geometrical configuration 291 is not limited to physical disk drives, but may be observed by a data storage device whose actual physical structure is completely unrelated to a disk drive. In a geometrical translation operation 293, device geometrical configuration 291 is mapped into a translated geometrical configuration 295 with parameters C', H', and S'. The BIOS, and thus the operating system access data storage according to these C', H', and S' parameters. Thus, the terms "translated geometrical configuration" and "translated geometry" refer to translated geometrical configuration 295 as utilized by the BIOS (and thus the operating system) for data storage access. In contrast, the terms "device geometrical configuration" or "geometrical configuration" without any qualifiers herein refer to device geometrical configuration 291 as seen and used by the mass storage device and/or the controller thereof.

Unfortunately, not all BIOS geometrical translation schemes are compatible from one BIOS to another. That is, for a given mass storage device, the geometrical translation scheme of one BIOS may produce a different translated geometrical configuration from that of another BIOS. As a result, problems may arise when a storage device configured on one computer is transferred to a computer having a different BIOS. The CHS parameters stored in the Partition Table are assumed by prior art startup loading code to correspond to the CHS parameters returned by the BIOS "Get Device Parameter" function ("Int13h function 08"). If this is not the case—if the geometrical configuration in the Partition Table does not match the translated geometrical configuration of the BIOS geometrical translation scheme—the startup loading process will fail because the BIOS "Read Sector" function ("Int13h function 02") will be relying on incompatible geometrical parameters.

It is noted that the BIOS Int13h function 08 "Get Device Parameter" function is used to obtain CHS parameter values from the BIOS. These are also denoted herein as "runtime" CHS parameter values. In contrast, CHS parameter values which were previously written to the BIOS Parameter Block, and are subsequently obtained by reading therefrom, are denoted herein as "recorded" CHS parameter values.

BIOS and BIOS Parameter Block Incompatibilities

As noted previously, if there is a fatal incompatibility between the BIOS used to set up and configure the mass storage device and the BIOS of the computer for which the mass storage device is to boot, the boot will fail.

There is also a related problem if there exists an incompatibility between the BIOS of the computer on which the mass storage device operates and the BPB recorded on the mass storage device. This incompatibility prevents the operating system from being able to properly access the device.

Logical Block Addressing

In the alternative "Logical Block Addressing" scheme, the sectors are numbered sequentially, starting at 0. The use of LBA notation is simpler than CHS and, as noted, does not depend on the internal geometry of a mass storage device. Unfortunately, however, for certain mass storage devices, it is the CHS parameters which are recorded in the BIOS Parameter Block (BPB) of the mass storage device, and which must be used for accessing that mass-storage device. (The BPB is stored in the boot sector, which is the first sector of an active partition of the mass storage device.) In addition, the location and extent of the active partition on the mass storage device is also recorded in the Partition Table of the MBR in terms of CHS parameters. As a result, there is currently no general solution for the problem of incompatibility that can occur when interchanging a mass storage device from one computer to another. Due to vast range of computer hardware (motherboards) and hard disk capacities, a mass storage device formatted and configured on one computer might not function properly on another computer. Data stored by the first computer on the storage device might be inaccessible to the second computer.

The Need for Interchangeability

The current trend is to make computer components easy to integrate. Typically, modem component devices have "plug-and-play" capability, giving users the ability to simply plug the device into a computer and let the computer handle the adaptations necessary to utilize that device. As detailed above, however, primary mass storage devices do not interchange from one computer to another so easily. The incompatibilities from one mass storage device to another are at a fundamental level involving the basic hardware of the computer, and are generally unreachable by "plug-and-play" techniques, which function at a higher level, via the operating system. Such devices must function at the basic hardware level not only to achieve high efficiency and rapid response, but because they have to be operative before the operating system has been loaded. Thus, without a solution to the incompatibility problem in interchanging mass-storage devices within a computer, the typical computer is sold to the user with the primary mass storage device already formatted and configured for use with that computer.

Need for Inter-System Compatibility of Mass Storage Devices

It is highly desirable to be able to manufacture and sell off-the-shelf mass storage devices with embedded applications that can boot and run on any type of hardware and BIOS. For example, it would be desirable to be able to develop a particular complex application in complete form and functional environment (perhaps even with a specialized operating system) by setting up the application on a relatively-inexpensive mass storage device and then marketing and distributing the mass storage device as a stand-alone merchandisable commodity. A user wishing to employ that application need only purchase the mass storage device, which would be plugged into an existing computer, which would boot and run the application immediately. Unfortunately, the current limitations described above do not allow such products to be freely marketed, and thus the growing embedded systems market is currently deprived of significant potential.

Summary of Prior Art and the Limitations Thereof

The concept of configuring a system to handle a variety of storage medium formats is known in other areas. For example, U.S. Pat. No. 4,928,192 to Bartlett, et al. (herein denoted as "Bartlett") discloses methods for adapting a computer to automatically handle different floppy disk formats regarding the presence or absence of servo information recorded in the media tracks. That is, Bartlett addresses variations in the physical recording process for the media. Bartlett, however, is specific to processes used with early floppy disk drives, and is not applicable to storage devices in general, particularly those of high capacity. Moreover, Bartlett does not address the issue of bootstrap loading. U.S. Pat. No. 5,430,855 to Walsh, et al. (herein denoted as "Walsh") discloses methods of using physically dissimilar disk drives (e.g., with different capacities and data rates) together in the same array despite their dissimilarities. Walsh, however, does not address the problem of mass storage device interchange regarding operation prior the loading of the operating system.

U.S. Pat. No. 5,721,952 to Lin, et al. (herein denoted as "Lin") addresses the device interchange problem as discussed in the present application, and discloses a method for automatically detecting the geometrical configuration of a disk drive. Lin also discloses that the software for this can be incorporated into the computer's BIOS for automatic detection prior to bootstrap loading. However, Lin does not address the problem of incompatibility in geometrical translation of storage device parameters, nor does Lin provide a means of adapting a storage device to be bootable on all computers. That is, Lin provide software for the BIOS of a computer, so although a computer according to Lin may be able to adapt to different storage devices, Lin does not solve the problem of allowing the storage device to adapt to different computers. This latter limitation is the problem addressed by the present invention.

U.S. Pat. No. 6,138,222 to Wyde, et al. (herein denoted as "Wyde") discloses a method of geometrical translation for adapting large-capacity disk drives to the limited addressing schemes in older computers. Wyde does not discuss overcoming the incompatibility of different geometrical translation schemes in general. Moreover, like Lin, Wyde also does not address the issue of adapting a storage device to be bootable on all computers.

Thus, many problems are seen to arise on account of using the obsolete CHS parameters for storage access. Despite the recognition of many of these problems, however, there is currently no solution to the bootable storage device interchange problem and the market need for inter-system compatibility of mass storage devices.

As described previously, the dependency between the preparation of the mass storage device and the actual startup loading process, requires the partition and format of the mass storage device to be done using the hardware and BIOS of the target computer (the computer in which the device is to be installed) to assure successful startup loading. If the preparation is done using different hardware or a different BIOS, it is possible that there will be an incompatibility with the enhanced CHS geometrical translation, causing a failure to load the operating system on startup.

Therefore, it is desirable to be able to supply mass storage devices ready for installation and use, without the need for formatting and configuration on the target computer. There is thus a widely recognized need for, and it would be highly advantageous to have, a method for configuring a storage device on one computer such that the storage device will load the operating system when installed on another computer regardless of the BIOS employed on that other computer. This goal is achieved by the present invention.

Details of Prior Art Limitations

To appreciate the novelty of the present invention, it is worthwhile to first present the following review of the prior art and the limitations thereof:

Preparing a Device for Startup Loading

In order to use a mass storage device for startup loading of an operating system, the device must undergo a preparation process. (A storage device capable of startup loading an operating system is herein denoted as a "bootable" device.) Utilities such as the DOS FDISK or the Windows NT Setup program prepare and partition the device, as described below and in FIG. 3. "Formatting" is the operation by which logic divisions called partitions are created in a mass storage device, and a file system capability is set up. A file system manages the way in which files are created and named, and where the files are placed logically for storage and retrieval. Certain types of mass storage devices, such as hard disk drives, are typically furnished by the manufacture in an unformatted condition and are formatted when installed on the computer.

Figure 3:
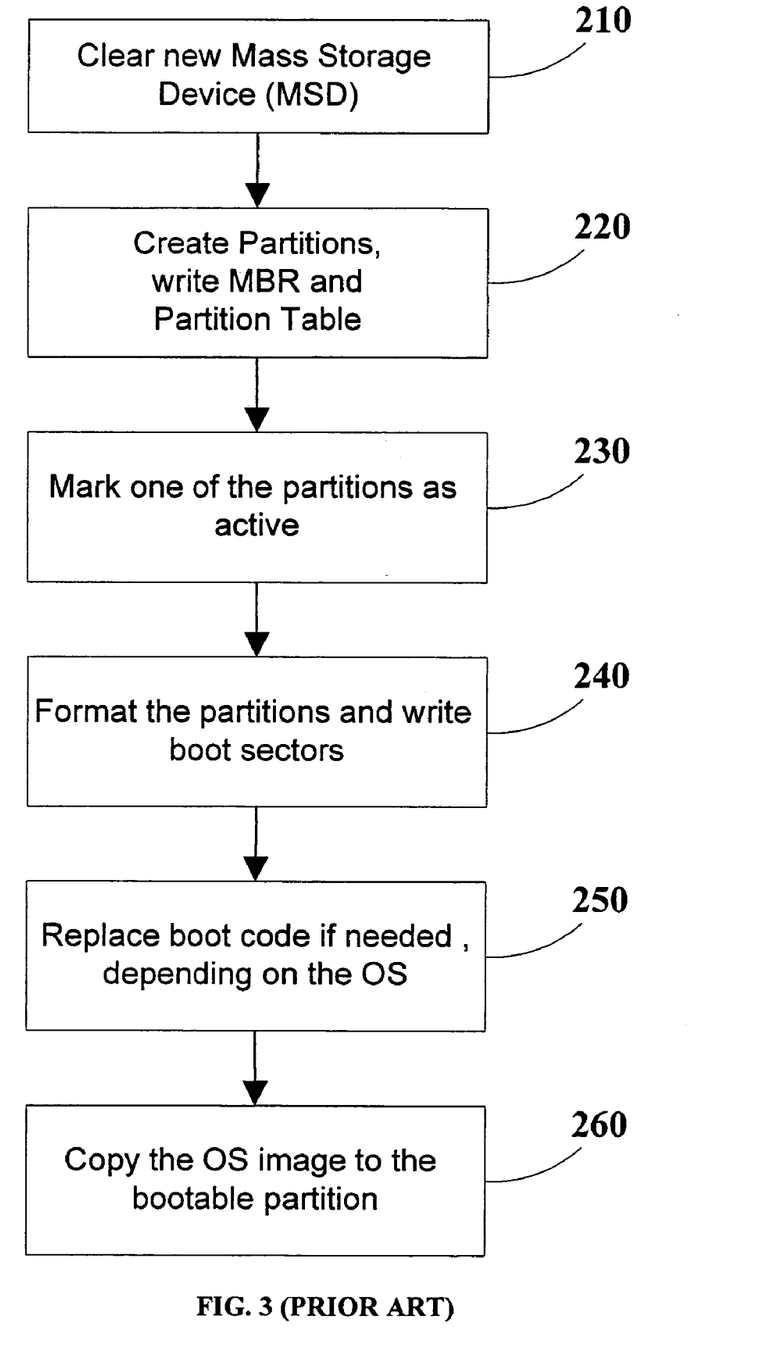
FIG. 3 is a flowchart of a prior-art procedure for setup and configuration of a mass storage device for loading of a computer operating system.

FIG. 3 is a flowchart of a prior-art procedure for preparing a mass storage device for use as a bootable device in a computer. In a step 210, the mass storage device is cleared of all data, if necessary. A new device direct from the manufacturer will normally not need step 210. Next, in a step 220 at least one partition (a logical division) is created on the mass storage device, and a Master Boot Record (MBR) with a partition table is set up on the device. The MBR contains a defined amount of space for executable code and a partition table typically having four entries. Each entry defines one partition location on the storage device (see FIG. 4B and the description below). In a step 230, the first byte in exactly one of the entries is set to mark the corresponding partition as "active" or "bootable". Then, in a step 240, the partitions are formatted. The formatting process creates a boot sector at the beginning of each partition (the boot sector is the first sector of a partition). The boot sector is critical for starting the computer. The boot sector contains executable code and data required by the executable code, including crucial information that file system loader uses to access the device. The executable code is operating system-dependent, and in some situations, new executable code must be written in the boot sector in a conditional step 250. For example, configuring a storage device to load Windows XP embedded typically starts by using FDISK to create a partition by, and then requires rewriting the boot sector (in step 250) with a "BootPrep" utility to replace the DOS-oriented executable code in the boot sector with Windows NT-oriented code. Following this formatting process, in a final step 260 the operating system image is copied to the partition.

Storage Device Organization and Storage Allocation

Figure 4B:
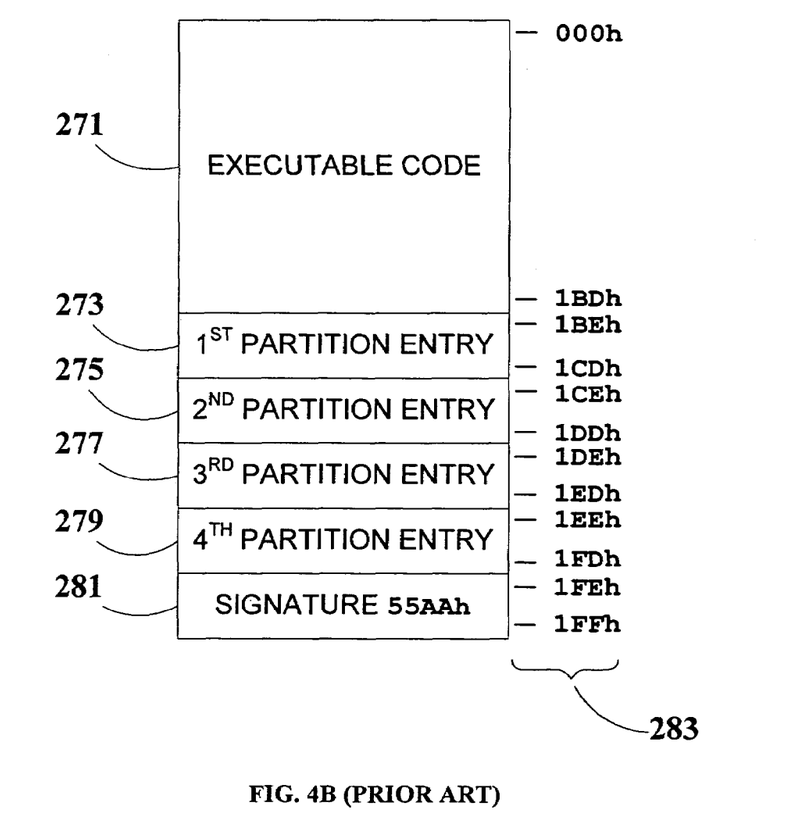
FIG. 4B is a diagram of the prior art storage allocation for a Master Boot Record.

FIG. 4B is a diagram of the prior-art allocation of storage in a Master Boot Record. An area 271 is reserved for executable code. An area 273 is for the first partition entry; an area 275 is for the second partition entry; an area 277 is for the third partition entry; and an area 279 is for the fourth partition entry. An area 281 is for a "signature" that enables verifying the partition table area. The signature is a constant 2-byte value equal to 55AAh. Addresses 283 show the beginning and end address of each area Each of the entries 273, 275, 277, and 279 is allocated 16 bytes.

One purpose of the partition table is to specify the physical start and end sectors of the partitions. The two addressing notation schemes discussed above, CHS and LBA, are represented in the partition entries as shown in the table below:

TABLE 1

Partition Table data

| Byte Offset | Field Length | Description |
|---|---|---|
| 00 | BYTE | Boot Indicator |
| 01 | BYTE | Beginning Head |
| 02 | 6 bits | Beginning Sector |
| 03 | 10 bits | Beginning Cylinder |
| 04 | BYTE | System ID |
| 05 | BYTE | Ending Head |
| 06 | 6 bits | Ending Sector |
| 07 | 10 bits | Ending Cylinder |
| 08 | 4 BYTES | Beginning sector (LBA notation) |
| 12 | 4 BYTES | Number of sectors in partition (LBA notation) |

The partition table contains 16 bytes of data, from byte 00 through byte 15. The beginning of the partition is indicated in CHS notation in bytes 01 through 03. The end of the partition is indicated in CHS notation is bytes 05 through 07. The beginning of the partition is indicated in LBA notation in bytes 08 through 11, and the number of sectors in the partition is indicated in bytes 12 through 15. Although LBA notation is much simpler and more supportive of larger mass storage devices than CHS notation, as noted previously, not all storage devices support LBA.

BIOS Parameter Block (BPB)

Partial contents of a BPB are illustrated in Table 2 below.

TABLE 2

Partial BIOS parameter Block (BPB)

| Byte Offset | Field Length | Sample Value | Field Name |
|---|---|---|---|
| 0x0B | WORD | 0x0002 | Bytes Per Sector |
| 0x0D | BYTE | 0x08 | Sectors Per Cluster |
| 0x0E | WORD | 0x0000 | Reserved Sectors |
| 0x10 | 3 BYTES | 0x000000 | always 0 |
| 0x13 | WORD | 0x0000 | not used by NTFS |
| 0x15 | BYTE | 0xF8 | Media Descriptor |
| 0x16 | WORD | 0x0000 | always 0 |
| 0x18 | WORD | 0x3F00 | Sectors per Track |
| 0x1A | WORD | 0xFF00 | Number of Heads |
| 0x1C | DWORD | 0x3F000000 | Hidden Sectors |
| 0x20 | DWORD | 0x00000000 | not used by NTFS |
| 0x24 | DWORD | 0x80008000 | not used by NTFS |
| 0x28 | LONGLONG | 0x4AF57F0000000000 | Total Sectors |
| 0x30 | LONGLONG | 0x0400000000000000 | Logical Cluster Number |
| 0x38 | LONGLONG | 0x54FF070000000000 | Logical Cluster Number |
| 0x40 | DWORD | 0xF6000000 | Clusters Per File Record |
| 0x44 | DWORD | 0x01000000 | Clusters Per Index Block |
| 0x48 | LONGLONG | 0x14A51B74C91B741C | Volume Serial Number |
| 0x50 | DWORD | 0x00000000 | Checksum |

The Origins of Incompatible Sector Addressing Schemes

In reality, no currently-manufactured mass storage devices actually have the physical geometry implied by CHS notation, but this obsolete system of sector addressing is still used when employing BIOS services. As mentioned previously, the primary interface to BIOS services is the Int13h software interrupt. The Int13h interface supports many different functions, such as reading, writing, and formatting the storage device. Using Int13h, however, requires knowing the specific geometry parameters associated with the mass storage device (even if these parameters are unrelated to the actual physical geometry of the device), and providing exact cylinder, head and sector addressing to the routines to allow device access. This has led to incompatibility problems. Due to lack of planning and coordination, there have arisen two different specifications for the allocation of bits to represent the geometrical configuration:

The Int13h interface allocates 24 bits for specifying storage device geometry, broken up as follows:
  10 bits for the cylinder number, for up to 1,024 cylinders.
  8 bits for the head number, for up to 256 heads.
  6 bits for the sector number, for up to 63 sectors.

The IDE hard disk standards specify a 28-bit allocation, broken up as follows:
  16 bits for the cylinder number, for up to 65,536 cylinders.
  4 bits for the head number, for up to 16 heads.
  8 bits for the sector number, for up to 256 sectors.

As noted in the example given previously, incompatibilities between these two systems might result in an inability to access up to 99.6% of the storage capacity of a large modern mass storage device, due to the 504 MB barrier.

Prior-Art Techniques for Overcoming CHS Limitations

The previously-mentioned technique of geometrical translation is the most common solution to overcome the 504 MB barrier. This is achieved by using an "enhanced" BIOS that supports BIOS geometrical translation. An enhanced BIOS translates CHS disk parameters to "enhanced CHS" parameters. In this scheme, the BIOS gets CHS parameters according to the IDE hard disk specification and translates those parameters to a different CHS geometrical configuration for use with operating systems using the Int13h 24-bit interface specification.

CHS geometrical translation is valid for devices with capacities up to 8.4 GB that use all 24 bits of the Int13h allocation (1024 cylinders*256 heads*63 sectors per track*512 bytes per sector=8.4 GB).

Mass storage devices with capacities over 504 MB and up to 8.4 GB commonly conform to the Int13h sector limit of 63 sectors. This makes a simple CHS geometrical translation "bit-shifting" scheme possible, in which the number of cylinders is divided by 2, 4, 8 or 16, while the number of heads is multiplied by the same number. The number of sectors per track is unchanged. The use of bit-shifting to accomplish the division and multiplication requires relatively little code and operates at high speed.

In a bit-shifting geometrical translation scheme, if C, H, S, c, h, and s are the original parameters and a prime symbol (') denotes translated parameters (i.e., C', H', S', c', h', and s'), then:

$C'=C/N$ $H'=H*N$, where N is the smallest power of two that will ensure $C' \leq 1024$; and $S'=S$ With mass storage devices having more than 63 sectors, the geometrical translation requires a more complex algorithm and code.

EXAMPLE 1

Bit-Shifting Scheme for CHS to Enhanced CHS Geometrical Translation

Assume a mass storage device with original CHS values C=4032, H=16, and S=63. The BIOS converts it to $$C'=C/4=1008\ (<1024)$$

$$H'=H*4=64$$

$$S'=S=63$$

CHS Incompatibilities Arising from Lack of Standardization in BIOS Enhancement

A typical current BIOS uses the enhanced CHS mode as standard in Int13h for mass storage devices with capacities less than 8.4 GB. The values for Beginning/Ending Head, Sector and Cylinder in the Partition table entry are saved in the enhanced CHS format. The geometrical translation between CHS and enhanced CHS modes, however, has not been standardized and is BIOS-dependent. There exist several algorithms to implement this geometrical translation, and these different algorithms have different results. Specifically, it is possible to obtain different values for C, H, and S when using INT13h function 08 "Get Device Parameters", depending on the BIOS used.

To show this, the BIOS illustrated in Example 1 above is denoted as "BIOS 1" in Table 3 below. A different BIOS producing different geometrical translation results for the same mass storage device is denoted as BIOS 2. Both BIOS 1 and BIOS 2 address the same beginning sector of a partition, as seen by the fact that in LBA notation (bytes 08-11 in the Partition Table) it is the same sector for each BIOS (192780). The Enhanced CHS parameters, however, are different. This means that if the mass storage is formatted and configured on a computer using BIOS 1, that same device will not function in a computer using BIOS 2.

TABLE 3

Example of Different BIOS Enhanced CHS Results

| Description | BIOS 1 | BIOS 2 |
|---|---|---|
| Int13h function 08 "Get device parameters" output | C' = 1008, H' = 64, S' = 63 | C' = 63, H' = 255, S' = 63 |
| Beginning cylinder c' | 47 | 12 |
| Beginning head h' | 52 | 0 |
| Beginning sector in track s' | 1 | 1 |
| Beginning Sector in LBA notation | 192780 | 192780 |

Converting from CHS to LBA

It is possible to convert between CHS and LBA notation. One direction, that of converting from CHS to LBA, is now described.

Converting from CHS notation to LBA notation is as follows: for a storage device with C cylinders, H heads and s sectors per track, a sector address denoted as c, h, s in CHS notation is denoted by s" in LBA notation, where $$s''=c*H*S+h*S+(s-1) \qquad (1)$$

The minus one is because sectors are traditionally counted starting at 1, although cylinders and heads are traditionally counted starting at 0. LBA notation is counted starting at sector 0.

The conversion from LBA to CHS is described in a following section.

EXAMPLE 2

CHS to LBA Conversion

For a mass storage device with CHS parameters C=1008, H=16, and S=63 converting sector c=1, h=2, s=3 in CHS notation yields LBA notation sector number s"=1*16*63+ 2*63+(3−1)=1136.

Mass Storage Devices with Capacities Greater than 8.4 GB

For mass storage devices with capacities greater than 8.4 GB, the BIOS and the operating system use only LBA notation, because for these larger capacities, CHS notation cannot be used.

SUMMARY OF THE INVENTION

The present invention provides a general solution for the mass storage device interchange problem, allowing a mass storage device configured on one computer to be capable of startup loading on another computer with a different BIOS. The present invention also resolves the previously-noted incompatibilities between the BIOS and BPB, to guarantee that the operating system will be able to properly access the mass storage device.

It is therefore an objective of the present invention that a mass storage device configured on one computer be capable of startup loading of an operating system when installed in another ("target") computer, independent of the BIOS of the target computer. It is a further objective of the present invention that a mass storage device configured on one computer be accessible to the operating system of the target computer, independent of the BIOS of the target computer.

The present invention simplifies and provides a robust and highly reliable preinstall process on mass storage devices, including, but not limited to hard disks. The novel features of the present invention enable a mass storage device to load operating systems such as Windows XP, Windows XPe, and Windows 2000 on computers with a range of motherboards.

The main obstacle to successful startup loading with a different target computer BIOS are that the CHS beginning and ending addresses in the Partition Table might not point to the true start of the partitions; and the BPB in the boot sector might contain invalid geometrical parameters for the mass storage device.

Consequently, solution of the present invention is based on reading the beginning sector number in LBA notation, and using that LBA data to recalculate the CHS parameters of the beginning sector number; updating and rewriting the BIOS Parameter Block table in the boot sector with a valid mass storage device geometrical translation in CHS parameters corresponding to the runtime CHS parameters obtained from the BIOS; and inclusion of the executable code for performing these operations in the Master Boot Record of the storage device, so that these operations are independent of the BIOS. Converting to LBA parameters overcomes the incompatibilities which cause a boot failure, and modifying the BPB overcomes the incompatibilities which lead to inability of the operating system to properly access the mass storage device.

Therefore, according to the present invention there is provided a data storage device for a computer including: (a) an active partition having a beginning sector with a beginning sector number; (b) a partition table containing the beginning sector number in LBA notation; and (c) a Master Boot Record containing executable code for converting the beginning sector number in LBA notation into CHS parameters.

Also, according to the present invention there is provided a data storage device for a computer, the computer having a BIOS with a geometrical translation scheme, the data storage device having a device geometrical configuration, the data storage device including executable code for loading an operating system into the computer independent of the geometrical translation scheme.

In addition, according to the present invention there is provided a data storage device for enabling a BIOS in a computer system to properly load an operating system, the data storage device including: (a) a Master Boot Record; (b) a BIOS parameter block; and (c) executable computer code for modifying the BIOS parameter block prior to loading the operating system, wherein the executable computer code is contained within the Master Boot Record.

Furthermore, according to the present invention there is provided, in a computer system having a BIOS used for loading an operating system from a data storage device, a data storage device having a BIOS parameter block and including executable computer code for modifying the BIOS parameter block prior to loading the operating system, thereby enabling proper loading of the operating system.

Moreover, according to the present invention there is provided a method for loading an operating system, including: (a) providing a data storage device that includes a partition table containing a beginning sector number in LBA notation and a Master Boot Record containing executable code for converting the beginning sector number from the LBA notation into CHS parameters; (b) loading the executable code from the Master Boot Record; (c) reading the beginning sector number in the LBA notation from the partition table; and (d) executing the executable code, thereby converting the beginning sector number into CHS parameters.

There is also provided, according to the present invention, a method for enabling a BIOS to load an operating system from a data storage device into a computer, wherein the data storage device has a BIOS parameter block and a Master Boot Record, the method including: (a) reading executable computer code contained in the Master Boot Record of the data storage device; and (b) executing the executable computer code to modify the BIOS parameter block prior to loading the operating system.

And additionally there is provided, according to the present invention, a method of using a first computer having a BIOS with a first geometrical translation scheme, for preparing a data storage device having a Master Boot Record to enable loading an operating system on a second computer having a BIOS with a second geometrical translation scheme different from the first geometrical translation scheme, the method including: (a) creating a BIOS parameter block on the data storage device; and (b) writing executable computer code onto the Master Boot Record of the data storage device, wherein executing the executable computer code causes the second computer to modify the BIOS parameter block prior to loading the operating system, to cause the second computer to load the operating system independent of the first geometrical translation scheme.

BRIEF DESCRIPTION OF THE DRAWINGS

The invention is herein described, by way of example only, with reference to the accompanying drawings, wherein.

DESCRIPTION OF THE PREFERRED EMBODIMENTS

The principles and operation of adaptively loading an operating system from a storage device, and storage devices for adaptive loading according to the present invention may be understood with reference to the drawings and the accompanying description.

Following is a description of an embodiment of the present invention, which implements executable code in the Master Boot Record of a mass storage device. The executable code gives the mass storage device the capability of performing a self-adaptive update to the geometrical parameters to assure a successful startup loading boot in the case that the mass storage device was prepared in a first computer, but is being used as boot device in different computer.

The mass storage device of this embodiment of the present invention has been prepared as boot device, and in a previous process a Master Boot Record and boot sector were written to the device, using a preparing computer.

For all operating systems, the MBR is located in the first sector of the mass storage device, at c=0, h=0, and s=1.

Figure 2:
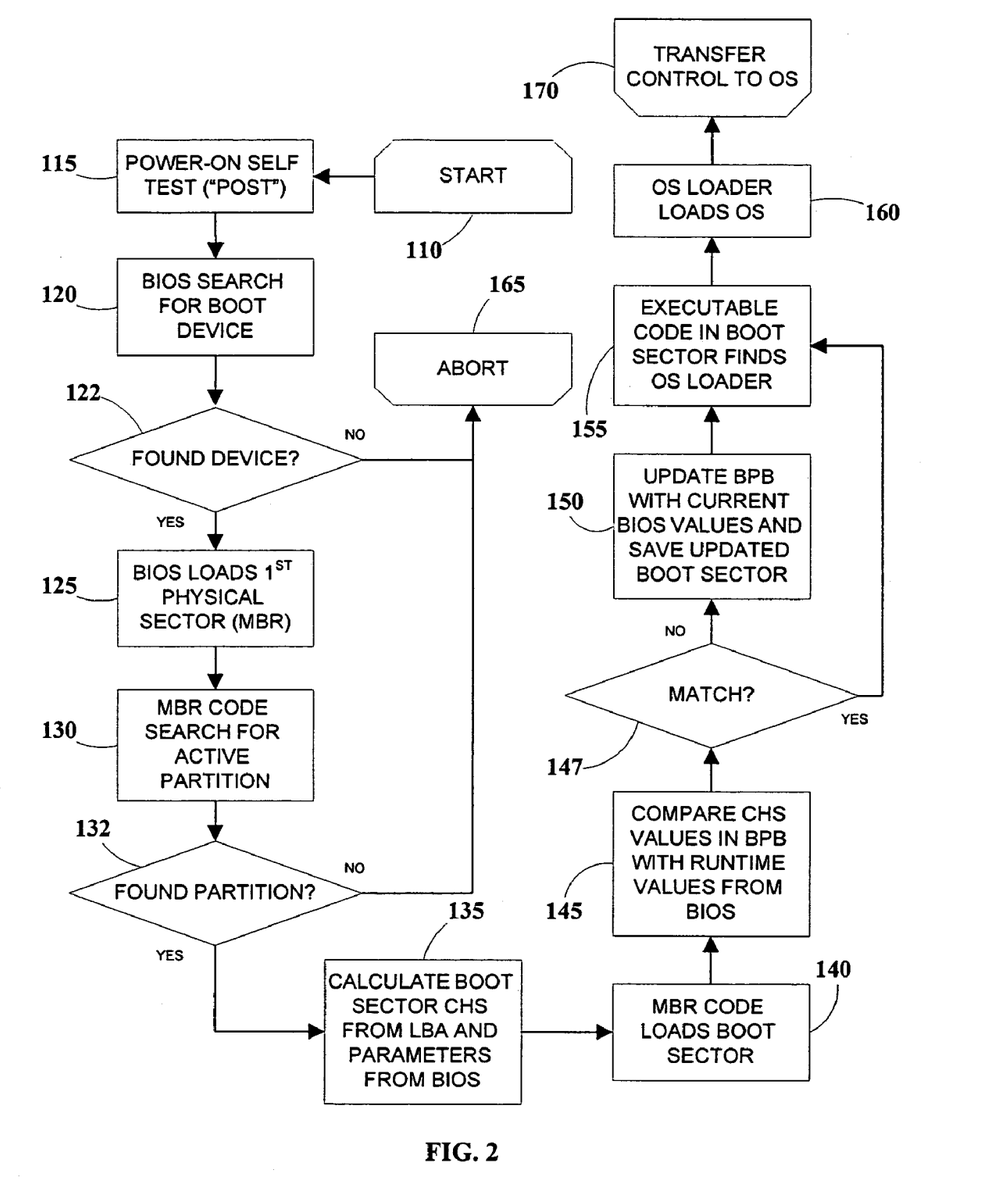
FIG. 2 is a flowchart of a procedure for adaptive startup loading of a computer operating system, according to an embodiment of the present invention.

FIG. 2 is a flowchart of a procedure for adaptive startup loading of a computer operating system, according to an embodiment of the present invention. In a step 110 the power to the computer is started. In a step 115 the computer runs a "Power-On Self Test" (POST) of the hardware. In a step 120 the BIOS searches for a bootable device. At a decision point 122, if no bootable device is found, the startup process terminates at an abort 165. Otherwise, if a bootable device is found, the BIOS loads the first physical sector, which is the MBR, as noted above. The BIOS uses Int13h function 02 "Read Sector" to access the MBR, which is copied to the computer's active memory. Next, in a step 130, the code in the MBR is executed to search for an active partition on the mass storage device. The code verifies that the Partition Table is valid and scans the Partition Table to look for the active partition. At a decision point 132, if no active partition is found, the startup process terminates at abort 165. Otherwise, if an active partition is found, then instead of reading the "Beginning of Partition" parameter using the CHS parameters (see Table 1, bytes 1 through 3 in the Partition Table) as in prior-art startup sequences, in a step 135 the executable code according to this embodiment of the present invention utilizes the LBA parameters (see Table 1, bytes 08 through 11 in the Partition Table) to recalculate the CHS parameters according to the geometrical parameters returned by the current BIOS. The recalculated CHS address of the first sector will be input to the Int13h function 02 "Read Sector", thereby insuring that the first sector of each partition will be found for all BIOS types.

EXAMPLE 3

Converting from LBA to CHS

Conversion from CHS to LBA has been previously described.

In this non-limiting example, a mass storage device is prepared in a computer having BIOS 1 and has the active partition beginning at c=47, h=52, s=1 in CHS notation and 192780 in LBA notation. See Table 4, below.

TABLE 4

Example of LBA notation as two different CHS sets

| Description | BIOS 1 | BIOS 2 |
|---|---|---|
| Int13h function 08 "Get device parameters" output | C = 1008, H = 64, S = 63 | C = 63, H = 255, S = 63 |
| Beginning cylinder c | 47 | 12 |
| Beginning head h | 52 | 0 |
| Beginning sector in track s | 1 | 1 |
| Beginning Sector in LBA notation | 192780 | 192780 |

If such a storage device were prepared according to the prior art and then installed in a computer having BIOS 2 (Table 4), the prior-art MBR code would try to load the boot sector from c=47, h=52, s=1 using the wrong H parameter (255 instead of 64), and would thus read the wrong sector. See Equation (1)—47*255*63+52*63+(−1)=758331 instead of sector 192780, resulting in boot failure.

Figure 5:
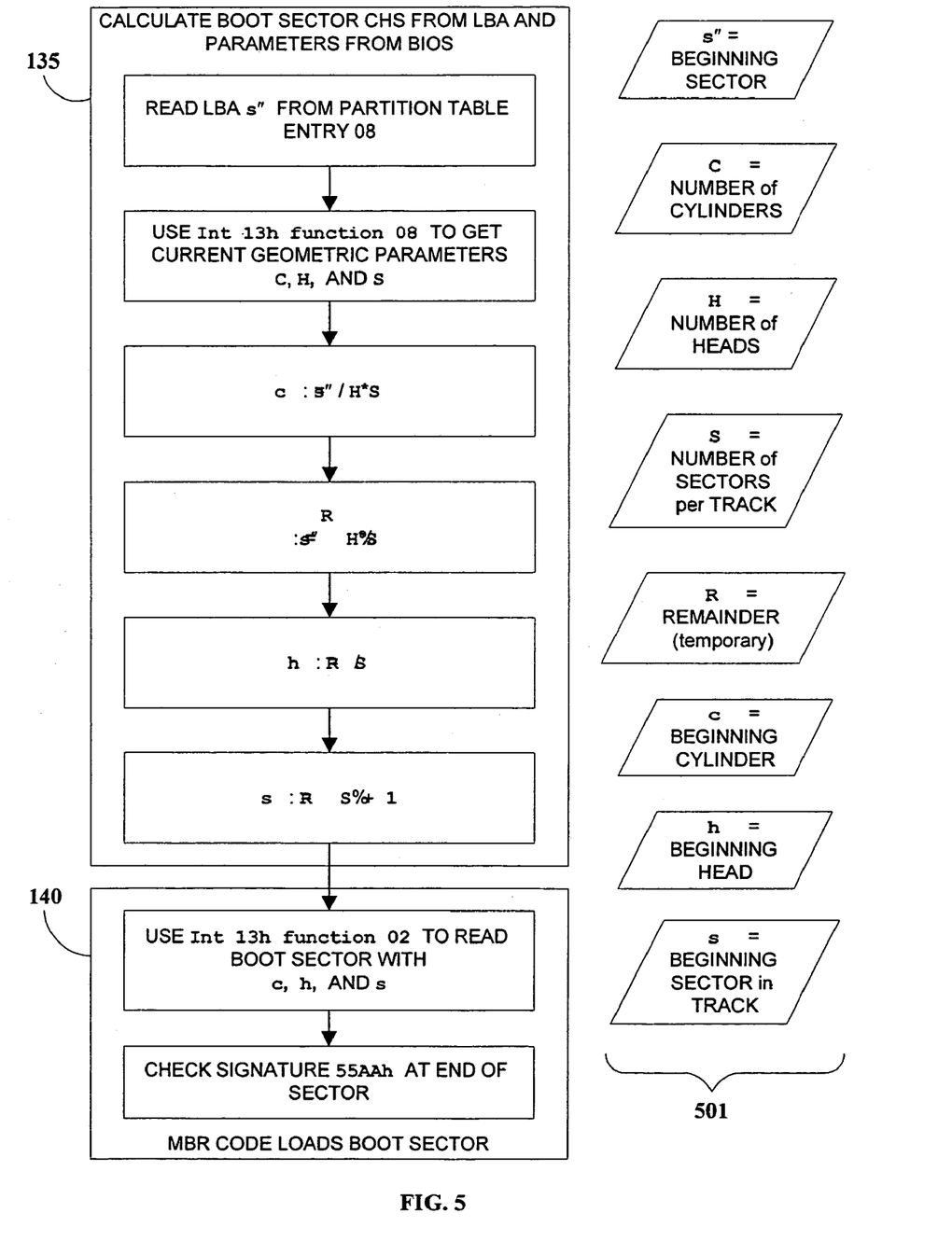
FIG. 5 is a detail view of steps in the adaptive procedure of FIG. 2.

In contrast to the prior art, however, the adaptive MBR code of the present invention first recalculates the CHS parameters from the LBA (in step 135 of FIG. 2). FIG. 5 shows the operations in detail for step 135, including a memory storage 501 for the parameters and variables of the operation. According to this embodiment of the present invention, the algorithm uses the current C, H, and S values returned from Int13h function 08 "Get device Parameters". Note that this is for BIOS 2 in Table 4, above.

$$c=s'''/H*S=192780/(255*63)=12$$

$$r=s'''\%H*S=0\{\% \text{ is the modulo, or remainder operator}\}$$

$$h=r/S=0$$

$$s=r\%S+1=0+1=1$$

The recalculated CHS notation c=12, h=0, s=1 is input to Int13h function 02 "Read Sector" instead of the original c=191, h=4, s=1 that appears in the Partition Table. In this way, a mass storage device prepared according to the present invention reads the correct sector in a step 140 (FIG. 2). FIG. 5 shows the details of this operation, including checking for the signature 55AAh.

Returning to FIG. 2, in a step 145, the CHS parameters from the BPB are compared with those returned by the BIOS Int13h function 08 "Get device Parameters". At a decision point 147, if the parameters do not match, then in a step 150, the BIOS Parameter Block (BPB) is updated with the correct parameters as determined by the call to BIOS Int13h function 08 "Get device Parameters". The update is done via a call to BIOS Int13h function 03 "Write Sector", which writes the entire sector (containing the updated BPB) back to the mass storage device. This is how a mass storage device according to the present invention is always able to boot properly with the current BIOS, regardless of what BIOS was originally used to set up and configure the mass storage device, thereby achieving the objectives of the present invention, as outlined previously.

Following the above, in a step 155 the running executable code finds the operating system loader. Decision point 147 goes directly to step 155 if the parameters already recorded in the BPB match those returned by BIOS Int13h function 08 "Get device Parameters" (i.e., the mass storage device is already configured for the present BIOS). The use of step 145 and decision point 147 avoids an unnecessary write operation if the parameters in the BPB are already correct. In another embodiment of the present invention, however, step 145 and decision point 147 are omitted, and step 140 unconditionally goes directly to the BPB update in step 150. In this alternate embodiment, the BPB is always updated with the correct current CHS parameters during the boot operation. This assures proper functioning, although most of the write operations are unnecessary (for subsequent power-on cycles on the same computer, the BPB is correct, and no update is required). After step 155, a step 160 loads the operating system, after which control is transferred to the operating system in a termination 170.

Referring to Table 2, it is noted that there are two geometry parameters in the BPB which may be incorrect, and which must be updated: the Sectors per Track (at byte offset 18 h) and the Number of Heads (at byte offset 1 Ah).

Once again, it is noted that the executable code which performs the above operations to enable interchangeable booting is located in the Master Boot Record of the mass storage device, and is independent of the BIOS.

While the invention has been described with respect to a limited number of embodiments, it will be appreciated that many variations, modifications and other applications of the invention may be made.

The invention claimed is:

1. A data storage device for a computer comprising:
   an active partition having a beginning sector with a beginning sector number;
   a partition table containing said beginning sector number in LBA notation;
   a BIOS parameter block; and
   a Master Boot Record containing executable code for converting said beginning sector number in LBA notation into CHS parameters and for writing at least one of said CHS parameters to said BIOS parameter block.

2. The data storage device of claim 1, wherein said BIOS parameter block is in said active partition.

3. The data storage device of claim 1, wherein said at least one CHS parameter includes at least one CHS geometry parameter.

4. A data storage device for enabling a BIOS in a computer system to properly load an operating system, the data storage device comprising:
   a Master Boot Record;
   a BIOS parameter block; and
   executable computer code for modifying said BIOS parameter block prior to loading the operating system, wherein said executable computer code is contained within said Master Boot Record; and wherein said executable computer code is for:
   obtaining runtime CHS values from the BIOS;

obtaining recorded CHS values from said BIOS parameter block;
comparing said runtime CHS values with said recorded CHS values; and
contingent on said comparing, modifying said recorded CHS values in said BIOS parameter block to enable loading the operating system.

5. A method for loading an operating system, comprising:
providing a data storage device that includes a partition table containing a beginning sector number in LBA notation, a Master Boot Record containing executable code for converting said beginning sector number from said LBA notation into CHS parameters, and a BIOS parameter block;
loading said executable code from said Master Boot Record;
reading said beginning sector number in said LBA notation from said partition table;
executing said executable code, thereby converting said beginning sector number into CHS parameters; and
writing at least one of said CHS parameters to said BIOS parameter block.

6. The method of claim 5, wherein said BIOS parameter block is in an active partition of said data storage device.

7. The method of claim 5, wherein said at least one CHS parameter includes at least one CHS geometry parameter.

8. A method for enabling a BIOS to load an operating system from a data storage device into a computer, wherein the data storage device has a BIOS parameter block and a Master Boot Record, the method comprising:
reading executable computer code contained in the Master Boot Record of the data storage device; and
executing said executable computer code to modify the BIOS parameter block prior to loading the operating system, by steps including:
executing said executable computer code to obtain runtime CHS values from the BIOS;
executing said executable computer code to obtain recorded CHS values from the BIOS parameter block;
executing said executable computer code to compare said runtime CHS values with said recorded CHS values; and
contingent on said comparing, executing said executable computer code to replace said recorded CHS values in said BIOS parameter block with said runtime CHS values.

9. A method of using a first computer having a BIOS with a first geometrical translation scheme, for preparing a data storage device having a Master Boot Record to enable loading an operating system on a second computer having a BIOS with a second geometrical translation scheme different from the first geometrical translation scheme, the method comprising:
creating a BIOS parameter block on the data storage device; and
writing executable computer code onto the Master Boot Record of the data storage device;
wherein executing said executable computer code causes the second computer to modify said BIOS parameter block prior to loading the operating system, to cause the second computer to load the operating system independent of the first geometrical translation scheme;
wherein executing said executable computer code further causes the second computer to perform at least one operation selected from the group consisting of:
converting between LBA and CHS parameters;
obtaining runtime CHS values from the BIOS,
obtaining recorded CHS values from the BIOS parameter block; and
comparing said runtime CHS values with said recorded CHS values; and
wherein said modifying said BIOS parameter block CHS values comprises updating said BIOS parameter block CHS values to agree with said runtime CHS values.

* * * * *